(12) United States Patent
Horimoto

(10) Patent No.: US 10,608,260 B2
(45) Date of Patent: Mar. 31, 2020

(54) GASKET AND METHOD OF MANUFACTURING THE SAME

(71) Applicant: NOK CORPORATION, Tokyo (JP)

(72) Inventor: Takayuki Horimoto, Fujisawa (JP)

(73) Assignee: NOK CORPORATION (JP)

( * ) Notice: Subject to any disclaimer, the term of this patent is extended or adjusted under 35 U.S.C. 154(b) by 184 days.

(21) Appl. No.: 15/565,390

(22) PCT Filed: Mar. 31, 2016

(86) PCT No.: PCT/JP2016/060621
§ 371 (c)(1),
(2) Date: Oct. 9, 2017

(87) PCT Pub. No.: WO2016/163297
PCT Pub. Date: Oct. 13, 2016

(65) Prior Publication Data
US 2018/0123146 A1 May 3, 2018

(30) Foreign Application Priority Data

Apr. 10, 2015 (JP) ................................ 2015-080802

(51) Int. Cl.
*H01M 8/0271* (2016.01)
*B29C 45/14* (2006.01)
(Continued)

(52) U.S. Cl.
CPC ........... *H01M 8/0271* (2013.01); *B29C 45/14* (2013.01); *B29C 45/14065* (2013.01);
(Continued)

(58) Field of Classification Search
None
See application file for complete search history.

(56) References Cited

U.S. PATENT DOCUMENTS 9,562,609 B2 * 2/2017 Shimazoe ........... H01M 8/0284
2001/0035595 A1 * 11/2001 Gemberling ...... B29C 45/14336
264/276
2005/0118484 A1 6/2005 Kawachi et al.

FOREIGN PATENT DOCUMENTS

CN 200 965 060 Y 10/2007
CN 203 894 003 U 10/2014
(Continued)

OTHER PUBLICATIONS

Extended European Search Report for Application No. EP 16 77 6464 dated Mar. 16, 2018 (7 pages).

*Primary Examiner* — Alix E Eggerding
(74) *Attorney, Agent, or Firm* — Harness, Dickey & Pierce, P.L.C.

(57) ABSTRACT

A gasket has a gasket main body which is made of a rubber-like elastic body, and a reinforcement body which is made of a material having a higher rigidity than the gasket main body. The gasket main body integrally has a tabular base portion, and a seal portion which is provided in an end portion in a width direction of the base portion, the reinforcement body is formed into a tabular shape, is set its thickness to be smaller than a thickness of the base portion, and is buried in the base portion in such a manner as to be exposed to a surface with one surface in a thickness direction of the base portion, and the reinforcement body is provided with a positioning hole for positioning the reinforcement body in relation to a metal mold forming the gasket main body on a plane.

3 Claims, 3 Drawing Sheets

(51) Int. Cl.
  *H01M 8/0286* (2016.01)
  *F16J 15/10* (2006.01)
  *F16J 15/12* (2006.01)
  *H01M 8/0284* (2016.01)
  *H01M 8/0276* (2016.01)
  *H01M 8/242* (2016.01)

(52) U.S. Cl.
  CPC ........... *F16J 15/104* (2013.01); *F16J 15/108* (2013.01); *F16J 15/122* (2013.01); *H01M 8/0276* (2013.01); *H01M 8/0284* (2013.01); *H01M 8/0286* (2013.01); *H01M 8/242* (2013.01); *Y02P 70/56* (2015.11)

(56) References Cited

FOREIGN PATENT DOCUMENTS

| | | |
|---|---|---|
| JP | S62152824 A | 7/1987 |
| JP | 2000127198 A | 5/2000 |
| JP | 2009202580 A | 9/2009 |
| JP | 2009269248 A | 11/2009 |
| JP | 2010253801 A | 11/2010 |
| JP | 2011238364 A | 11/2011 |

\* cited by examiner

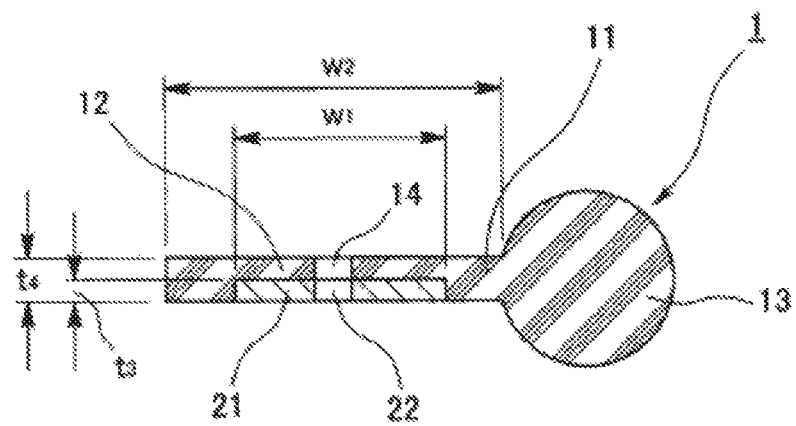
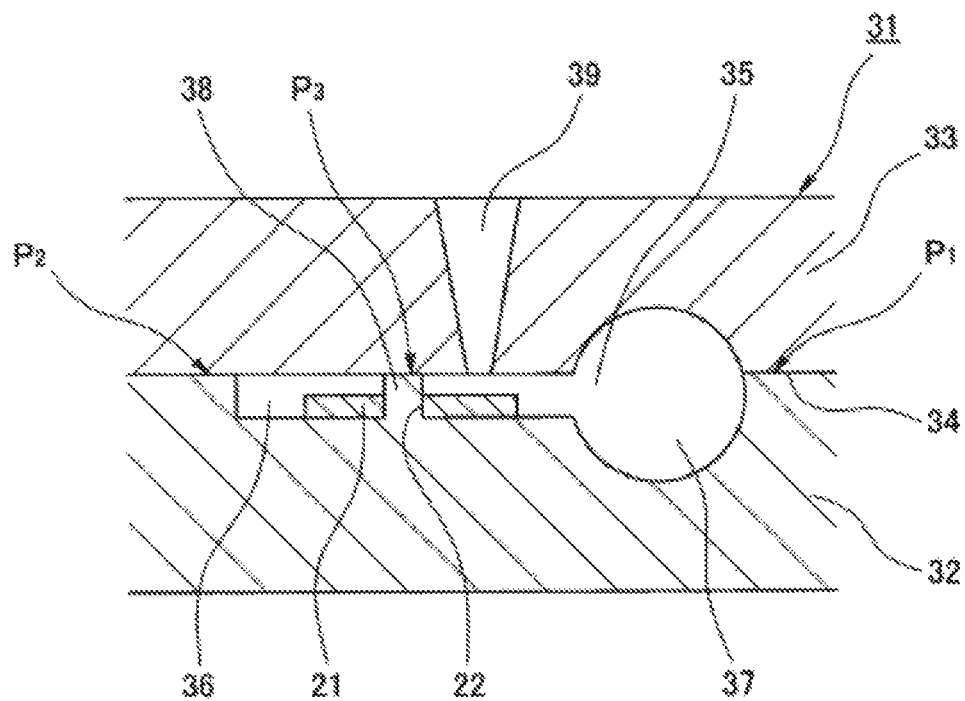

GASKET AND METHOD OF MANUFACTURING THE SAME

CROSS-REFERENCE TO RELATED APPLICATIONS

This application is a U.S. National Stage Application of International Application No. PCT/JP2016/060621, filed on Mar. 31, 2016, and published in Japanese as WO 2016/163297 A1 on Oct. 13, 2016 and claims priority to Japanese Application No. 2015-080802, filed on Apr. 10, 2015. The entire disclosures of the above applications are incorporated herein by reference.

BACKGROUND OF THE INVENTION

Field of the Invention

The present invention relates to a gasket according to a sealing technique and a method of manufacturing the same. The gasket according to the present invention is used, for examples, as a gasket for a fuel battery.

Description of the Conventional Art

The gasket used, for example, as the gasket for the fuel battery includes a membrane surface seal which seals an ion exchange membrane, and a refrigerant seal which seals a cooling side. A method of assembling the gasket in relation to a stack includes a system for integrally forming the gasket in a cell member such as a separator plate, an MEA and a GDL, a system for integrally forming the gasket in a resin reinforcement body with an adhesive material and attaching the gasket to the cell member such as the MEA and the separator, and a system for forming the gasket as a single body and assembling the gasket in the cell member.

In the case of the system for forming the gasket as the single body and assembling the gasket in the cell member, the gasket is in a state in which the gasket has no rigidity. Therefore, a problem exists in a handling property at the assembling time.

As an idea for improving the problem, there is listed up an idea that a reinforcement body 52 having a rigidity is integrally formed in relation to a gasket 51 as shown in FIG. 3A.

However, in this case, it is necessary to set a mold clamping portion 62 on a plane surface of the reinforcement body 52 so that the reinforcement body 52 does not move within a metal mold 61 when the gasket 51 is formed by using the metal mold 61 as shown in FIG. 3B.

On this account, a gap c may be generated between split molds 63 and 64 of the metal mold 61 at the mold clamping time due to a variation in a thickness t1 of the reinforcement body 52. In the case that the gap c is generated, there is fear that burrs are generated and there is further fear that a variation in a thickness t2 of the gasket 51 is enlarged.

The present invention is made by taking the above point into consideration, and an object of the present invention is to provide a gasket in which a gap is hard to be generated between split molds of a metal mold at the mold clamping time even in the case that a variation exists in a thickness of a reinforcement body, whereby it is possible to prevent burrs from being generated due to the gap and prevent the variation in the thickness of the gasket from being enlarged, and a method of manufacturing the same.

SUMMARY OF THE INVENTION

In order to achieve the object mentioned above, a gasket according to a first aspect of the present invention has a gasket main body which is made of a rubber-like elastic body, and a reinforcement body which is made of a material having a higher rigidity than the gasket main body, wherein the gasket main body integrally has a tabular base portion, and a seal portion which is provided in an end portion in a width direction of the base portion, the reinforcement body is formed into a tabular shape, is set its thickness to be smaller than a thickness of the base portion, and is buried in the base portion in such a manner as to be exposed to a surface with one surface in a thickness direction of the base portion, and the reinforcement body is provided with a positioning hole for positioning the reinforcement body in relation to a metal mold forming the gasket main body on a plane.

Further, a method of manufacturing a gasket according to a second aspect of the present invention is a method of manufacturing the gasket described in the first aspect mentioned above, wherein the method includes the steps of preparing the metal mold having a cavity which forms the gasket main body, and a molding material injection port which injects a molding material into the cavity, making the molding material injection port open to a position which laps on a plane over the reinforcement body which is set to a fixed position within the cavity by the positioning hole, and injecting the molding material while pressing the reinforcement body to an inner surface of the cavity with an injection pressure for injecting the molding material from the molding material injection port to the cavity.

In the gasket according to the present invention having the structure mentioned above, the rigid reinforcement body combined with the gasket main body is formed into the tabular shape, is set its thickness to be smaller than the thickness of the base portion in the gasket main body, and is buried in the base portion in such a manner as to be exposed to the surface by one surface in the thickness direction of the base portion. As a result, when the reinforcement body is set to the cavity of the metal mold, the gasket is set to a state in which the reinforcement body comes into contact with only one split mold (the split mold in such a direction that the reinforcement body is exposed to the surface) of the metal mold, and does not come into contact with the other split mold. Therefore, since the mold clamping portion of the metal mold is set to a position which is deviated from the plane surface of the reinforcement body based on this, the variation in the thickness of the reinforcement body does not affect whether or not the gap is generated between the split molds of the metal mold at the mold clamping time. Therefore, according to the desired object of the present invention, the gap is hard to be generated between the split molds of the metal mold at the mold clamping time even if the variation exists in the thickness of the reinforcement body. Accordingly, it is possible to prevent the burrs from being generated due to the gap, and prevent the variation in the thickness of the gasket from being enlarged.

In the case that the mold clamping portion of the metal mold is set to the position which is deviated from the plane surface of the reinforcement body as mentioned above, the reinforcement body is not pinched between the split molds. As a result, it is necessary to specially devise in such a manner as to prevent the reinforcement body from moving within the cavity. Consequently, the present invention utilizes the injection pressure when the molding material is injected to the cavity from the molding material injection port in the metal mold, as the means for preventing the reinforcement body from moving within the cavity, and makes the reinforcement body not move in the thickness direction of the reinforcement body within the cavity by injecting the molding material while pressing the reinforcement body to the inner surface of the cavity (the inner surface of the one split mold) by this injection pressure. In relation to the planar direction of the reinforcement body, since the positioning hole is provided in the reinforcement body, the reinforcement body is inhibited from moving in the planar direction within the cavity by engaging the reinforcement body with the metal mold by the positioning hole.

Effect of the Invention

The present invention achieves the following effects.

More specifically, in the present invention, the variation in the thickness of the reinforcement does not affect whether or not the gap is generated between the split molds of the metal mold at the mold clamping time as described above. Therefore, even if the variation exists in the thickness of the reinforcement body, the gap is hard to be generated between the split molds of the metal mold at the mold clamping time. As a result, it is possible to prevent the burrs from being generated due to the gap, and prevent the variation in the thickness of the gasket from being enlarged.

BRIEF EXPLANATION OF THE DRAWINGS

FIG. 1A is a cross sectional view of a substantial part of a gasket according to an embodiment of the present invention;

FIG. 1B is an explanatory view showing a method of manufacturing the gasket;

DETAILED DESCRIPTION OF PREFERRED EMBODIMENT

Next, a description will be given of an embodiment according to the present invention with reference to the accompanying drawings.

Figure 2:
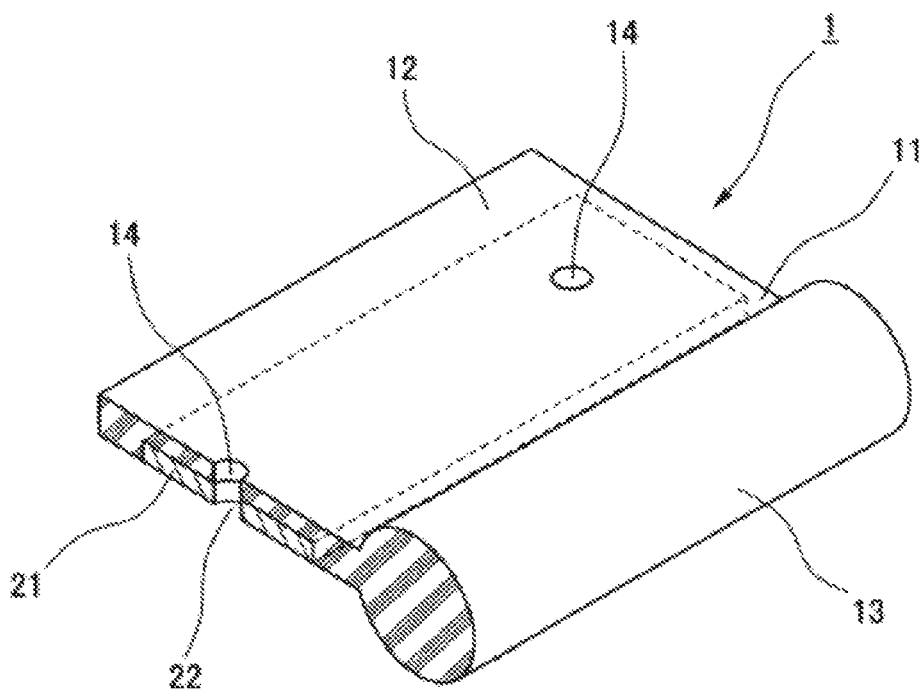
FIG. 2 is a perspective view of the substantial part cross section of the gasket.
Figure 3A:
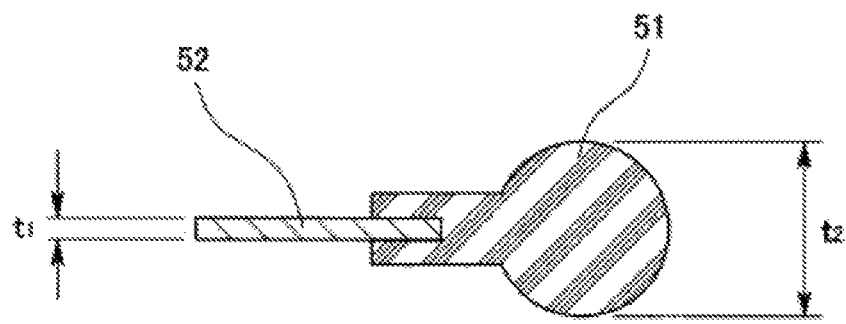
FIG. 3A is a cross sectional view of a substantial part of a gasket according to a conventional example.
Figure 3B:
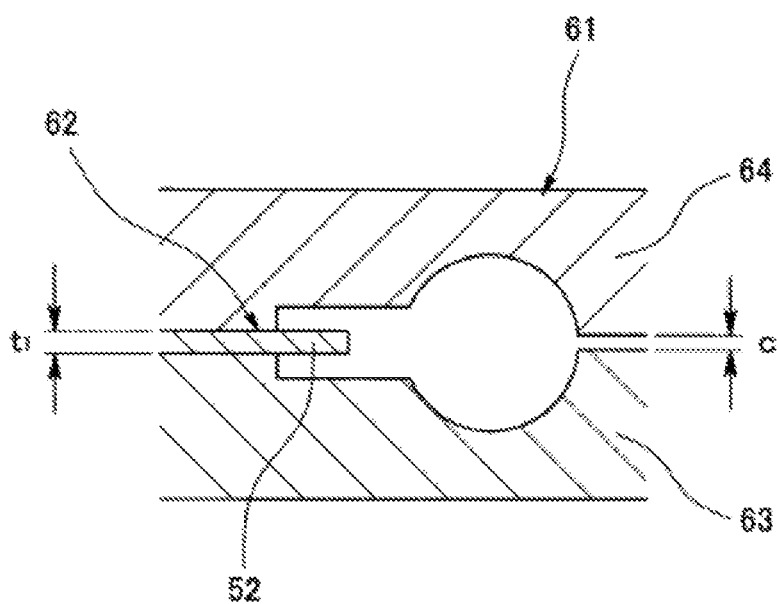
FIG. 3B is an explanatory view showing a method of manufacturing the gasket.

FIGS. 1A and 2 show a gasket 1 according to an embodiment of the present invention. The gasket 1 according to the embodiment is used as a gasket for a fuel battery for sealing fuel or cooling medium in an inner portion of a fuel battery cell, and has a gasket main body 11 which is made of a rubber-like elastic body, and a reinforcement body 21 which is made of a material having a higher rigidity than the gasket main body 11.

The gasket main body 11 integrally has a tabular base portion 12, and a seal portion 13 which is provided in an end portion in a width direction of the base portion 12. The seal portion 13 is formed into a double-face lip shape having a circular cross section, and the tabular base portion 12 is integrally formed in the middle of the seal portion 13 in a thickness direction. The gasket main body 11 is formed into a frame body shape as a whole, for example, for surrounding a periphery of a reaction surface at the center of a plane surface in a fuel battery cell having a rectangular plane surface.

Meanwhile, the reinforcement body 21 is formed into a tabular shape, is set its thickness t3 to be smaller than a thickness t4 of the base portion 12, and is buried in the base portion 12 in such a manner as to be exposed to a surface by one surface (a lower surface in the drawing) of the base portion 12 in the thickness direction. Further, since the reinforcement body 21 is set its width w1 to be smaller than a width w2 of the base portion 12, the reinforcement body 21 does not have a position which protrudes out of the base portion 12 to an external portion, and is buried as a whole in the base portion 12. A material of the reinforcement body 21 is specifically set to a thin plate-like metal or resin, and a thickness t3 thereof is frequently set to about 0.05 to 0.5 mm in an actual dimension. The reinforcement body 21 is formed as a whole into a frame body shape, for example, for surrounding a periphery of a reaction surface at the center of the plane surface in the fuel battery cell having the rectangular plane surface in correspondence to the gasket main body 11, however, can be formed into a shape obtained by arranging a plurality of strip shapes. In the case that the reinforcement body 21 is formed into the strip shape, the width thereof is frequently set to about 2 to 6 mm and the length thereof is frequently set to about 20 to 500 mm in an actual dimension.

Further, a required number of positioning holes 22 are provided on the plane surface of the reinforcement body 21 for positioning the reinforcement body 21 on a plane surface in relation to the metal mold 31 forming the gasket main body 11, and a required number of holes 14 are provided in the base portion 12 in correspondence thereto. Both the holes 22 and 14 form through holes which pass through the reinforcement body 21 and the base portion 12 in a thickness direction.

FIG. 1B shows the metal mold 31 for forming the gasket 1. The metal mold 31 is constructed by a combination of one split mold (a lower mold) 32 and the other split mold (an upper mold) 33, and a cavity 35 for forming the gasket main body 11 is provided in a paring portion 34 between both the split molds 32 and 33. The cavity 35 has a base portion forming portion 36 for forming the base portion 12, and a seal portion forming portion 37 for forming the seal portion 13. The latter seal portion forming portion 37 is depressed over both the split molds 32 and 33, but the former base portion forming portion 36 is depressed only in the one split mold 32.

A positioning convex portion 38 is provided on a plane surface of the base portion forming portion 36 in an inner surface of the cavity 35 in the one split mold 32, for positioning the reinforcement body 21 on the plane surface in relation to the metal mold 31, and the positioning hole 22 is fitted to the positioning convex portion 38, thereby positioning the reinforcement body 21 on the plane surface in relation to the metal mold 31. A height of the positioning convex portion 38 is set to be the same as a depth of the base portion forming portion 36. As a result, the positioning convex portion 38 comes into contact with the other split mold 33 by a leading end surface thereof at the mold clamping time.

Further, the other split mold 33 is provided with a molding material injection port 39 for injecting the molding material into the cavity 35. The molding material injection port 39 is arranged so as to be open to a position which laps on a plane surface over the reinforcement body 21 in a state in which the reinforcement body 21 is set to a fixed position within the cavity 35 on the basis of the engagement of the positioning hole 22 with the positioning convex portion 38.

In the gasket 1 having the structure mentioned above, the rigid reinforcement body 21 combined with the gasket main body 11 made of the rubber-like elastic body is formed into a tabular shape, is set its thickness t3 to be smaller than the thickness t4 of the base portion 12 in the gasket main body 11, and is buried in the base portion 12 in such a manner as to be exposed to the surface by one surface of the base portion 12 in the thickness direction. As a result, in the case that the reinforcement body 21 having the structure mentioned above is set to the cavity 35 of the metal mold 31 and the mold is clamped, the reinforcement which is set, becomes to a state in which the reinforcement body 21 comes into contact with only the one split mold 32 of the metal mold 31 and does not come into contact with the other split mold 33, as shown in FIG. 1B. Therefore, the mold clamping portion (the position to be exposed to the mold fastening load) in the metal mold 31 includes two positions of an outside point P1 of the cavity 35 and an inside point P2 of the cavity 35. Accordingly, the mold clamping portion is set to the position which is deviated from the plane surface of the reinforcement body 21 based on this. Even if any variation exists in the thickness t3 of the reinforcement body 21, the variation does not affect whether or not the gap is generated between the split molds 32 and 33 of the metal mold 31 at the mold clamping time. More specifically, even if any variation exists in the thickness t3 of the reinforcement body 21, any gap is not generated between the split molds 32 and 33. As a result, even if any variation exists in the thickness t3 of the reinforcement body 21, the gap is hard to be generated between the split molds 32 and 33 of the metal mold 31 at the mold clamping time, so that it is possible to prevent the burrs from being generated due to the gap and prevent the variation in the thickness of the gap 1 from being enlarged.

In the case that the positioning convex portion 38 provided in the one split mold 32 in the metal mold 31 comes into contact with the other split mold 33 by the leading end surface thereof as mentioned above, a third point P3 of the mold clamping portion is set here, however, since the positioning hole 22 of the reinforcement body 21 is positioned blow the third point P3, the third point P3 is also set to a position which is deviated from the plane surface of the reinforcement body 21.

Further, in a method of manufacturing the gasket 1 mentioned above, since the molding material injection port 39 in the metal mold 31 is arranged so as to be open to the position which laps on the plane surface over the reinforcement body 21 as mentioned above, the injection pressure presses the reinforcement body 21 to the inner surface of the one split mold 32 in the inner surface of the cavity 35 in the case that the molding material is injected from the molding material injection port 39 to the cavity 35. Therefore, in spite of the fact that the reinforcement body 21 is not pinched by both the split molds 32 and 33 at the mold clamping time, it is possible to inhibit the reinforcement body 21 from moving in the thickness direction within the cavity 35. Further, in relation to the plane surface direction of the reinforcement body 21, since the positioning hole 22 is provided in the reinforcement body 21, the reinforcement body 21 is prevented from moving in the plane surface direction within the cavity 35 by engaging the reinforcement body 21 with the metal mold 31 by the positioning hole 22. Therefore, since the reinforcement body 21 does not move in the thickness direction and the plane surface direction within the cavity 35, it is possible to manufacture the gasket 1 in which the reinforcement body 21 is buried at an accurate position in the gasket main body 11.

What is claimed is:

1. A method of manufacturing a gasket, the gasket comprising:
    a gasket main body which is made of a rubber-like elastic body; and
    a reinforcement body which is made of a material having a higher rigidity than the gasket main body, the reinforcement body including an upper major surface and a lower major surface;
    wherein the gasket main body has a tabular base portion integral therewith, and a seal portion which is provided in an end portion in a width direction of the tabular base portion;
    the reinforcement body is formed into a tabular shape, has a thickness that is less than a thickness of the tabular base portion, and is buried in the tabular base portion in such a manner that the lower major surface is not buried in the tabular base portion and is coplanar with a surface of the tabular base portion; and
    the reinforcement body includes a positioning hole for positioning the reinforcement body relative to a metal mold forming the gasket main body on a plane,
    the method comprising the steps of:
    preparing the metal mold having a cavity which forms the gasket main body, and a molding material injection port which injects a molding material into the cavity;
    making the molding material injection port open to a position which laps on a plane over the reinforcement body which is set to a fixed position within the cavity by the positioning hole; and
    injecting the molding material while pressing the reinforcement body to an inner surface of the cavity with an injection pressure for injecting the molding material that is injected from the molding material injection port to the cavity.

2. The method of claim 1, wherein the molding material injection port applies the molding material directly to the upper major surface of the reinforcement body.

3. The method of claim 1, wherein an entirety of the reinforcement body has a thickness that is less than a thickness of the tabular base portion.

* * * * *